United States Patent [19]
Ward et al.

[11] Patent Number: 5,793,328
[45] Date of Patent: Aug. 11, 1998

[54] METHOD AND APPARATUS FOR DETERMINING POSITION USING GLOBAL POSITIONING SATELLITES

[75] Inventors: John Ward, Wattsville; William S. Ward, Assawoman, both of Va.

[73] Assignee: The United States of America as represented by the Administrator of the National Aeronautics and Space Administration, Washington, D.C.

[21] Appl. No.: 627,817

[22] Filed: Apr. 1, 1996

[51] Int. Cl.⁶ .............................. G01S 5/02; H04B 7/185
[52] U.S. Cl. ............................................ 342/357; 375/208
[58] Field of Search ............................ 342/357; 375/208

[56] References Cited

U.S. PATENT DOCUMENTS

| | | | |
|---|---|---|---|
| 4,754,283 | 6/1988 | Fowler | 342/461 |
| 5,347,285 | 9/1994 | MacDoran et al. | 342/357 |
| 5,347,546 | 9/1994 | Abadi et al. | 375/75 |
| 5,379,224 | 1/1995 | Brown et al. | 342/357 |
| 5,402,441 | 3/1995 | Washizu et al. | 375/208 |
| 5,457,713 | 10/1995 | Sanderford, Jr. et al. | 375/206 |

*Primary Examiner*—Gregory C. Issing
*Attorney, Agent, or Firm*—Robert D. Marhchant; Eileen A. Lehmann

[57] ABSTRACT

A global positioning satellite receiver having an antenna for receiving a L1 signal from a satellite. The L1 signal is processed by a preamplifier stage including a band pass filter and a low noise amplifier and output as a radio frequency (RF) signal. A mixer receives and de-spreads the RF signal in response to a pseudo-random noise code, i.e., Gold code, generated by an internal pseudo-random noise code generator. A microprocessor enters a code tracking loop, such that during the code tracking loop, it addresses the pseudo-random code generator to cause the pseudo-random code generator to sequentially output pseudo-random codes corresponding to satellite codes used to spread the L1 signal, until correlation occurs. When an output of the mixer is indicative of the occurrence of correlation between the RF signal and the generated pseudo-random codes, the microprocessor enters an operational state which slows the receiver code sequence to stay locked with the satellite code sequence. The output of the mixer is provided to a detector which, in turn, controls certain routines of the microprocessor. The microprocessor will output pseudo range information according to an interrupt routine in response detection of correlation. The pseudo range information is to be telemetered to a ground station which determines the position of the global positioning satellite receiver.

14 Claims, 4 Drawing Sheets

METHOD AND APPARATUS FOR DETERMINING POSITION USING GLOBAL POSITIONING SATELLITES

ORIGIN OF THE INVENTION

The invention described herein was jointly made by an employee of the United States Government and a non-employee of the United States Government. This invention may be manufactured and used by or for the Government for governmental purposes without the payment of any royalties thereon or therefor.

TECHNICAL FIELD

The present invention relates generally to a method and apparatus for determining the position of an object, and more particularly to a method and apparatus for determining the position of an object using a low cost global positioning satellite receiver, such as balloon radiosondes, sonobuoys, ships, land vehicles and other objects on or near the earth's surface, using satellites of the Global Positioning System (GPS).

BACKGROUND ART

Many thousands of balloon radiosondes are launched yearly in the world. Most of these are launched from commercial airports twice daily to gather meteorological data, such as data on winds aloft for flight planning purposes. Another large user of balloon radiosondes are the armed forces who need to know winds aloft in connection with artillery and missile trajectory projections. Currently, most balloon radiosondes use one of the following to determine balloon position:

Loran Transponder

Omega Transponder

Radar Tracking

Radiotheodolite Tracking.

Both Loran and Omega are scheduled for termination within the next 20 years. Radar tracking is prohibitively expensive for most synoptic applications. Radiotheodolite tracking systems are expensive to maintain and suffer from multi-path problems at low tracking elevations. Accordingly, a need for a low cost global positioning satellite receiver has arisen.

The United States government has placed a number of satellites in orbit as part of the Global Positioning System (GPS). A GPS receiver simultaneously or sequentially receives signals from four or more satellites to determine various parameters, such as time, receiver position and velocity. Each satellite transmits two L-band signals known as L1 (1.57542 GHz) and L2 (1.2277 GHz), using a spread spectrum technique in which the carriers are bi-phase modulated with a pseudo random number (PRN) sequence or code. The L2 band transmits a code available only to authorized users and is not used in the current invention. In fact, the L1 carrier is modulated with two PRN codes, a coarse/acquisition (C/A) code and a precision (P) code and is available to any user, military or civilian. Each satellite is assigned a unique C/A and P code sequence. For the purpose of the following disclosure, we are only interested in the C/A code modulation of the L1 carrier.

In order to determine position in three dimensions, a receiver must simultaneously or sequentially track at least four satellites. A GPS receiver is able to track a given GPS satellite when it can synchronize an internally generated replica of the C/A code with the C/A code being transmitted by the satellite. In a typical GPS receiver, the L1 signal is received by an antenna, bandpass filtered, amplified by a low noise amplifier (LNA) and then down converted to an intermediate frequency (IF) by mixing with the multiplied output of a voltage controlled oscillator (VCO). The resulting IF signal is then de-spread or correlated with an internally generated version of the satellite's C/A code sequence. A raw pseudo-range is determined by observing where in the C/A code sequence that correlation occurs at some instant in time. "Raw" refers to the determination of range prior to correction for clock errors, atmospheric effects, and other known factors. At least four Pseudo-ranges are processed to determine a receiver's position.

Virtually all conventional GPS receiver designs make use of a Costas Loop to decode a 50 bit per second navigation message and also use either a Costas Loop or a separate carrier tracking loop to phase lock a local oscillator to the satellite carrier and to compensate for Doppler effects.

Additionally, a codeless GPS receiver has been developed for use in balloon radiosondes as a low cost alternative to a traditional code tracking receiver. In the codeless receiver, the L1 signal is stripped of its bi-phase modulation by means of a squaring technique and then carrier Doppler information is analyzed to determine receiver velocity and position. By converting the GPS signal into two quadrature components and then multiplying the two quadrature components together, the 180° spread spectrum code is removed from the carrier frequency. The multiplied result is bandpass filtered to pass two times the expected Doppler frequency shift from which velocity information is subsequently derived.

Finally, a method is known to the art in which the wideband spread spectrum L1 signals from a plurality of satellites is frequency compressed and its Fourier components analyzed to extract velocity and position information.

The limitations of GPS technologies currently known to the art contribute to the complexity and cost of current receivers. Correlation must be performed at a down-converted frequency, requiring a local oscillator and mixer. The alternative codeless technique suffers from a signal-to-noise inefficiency which impairs the accuracy of determining position and velocity.

STATEMENT OF THE INVENTION

Accordingly, it is an object of the present invention to provide a method for determining the position of an object.

It is another object of the present invention to provide an apparatus for determining the position of an object.

It is yet another object of the present invention to provide a method for determining the position of an object using a global positioning satellites.

It is also an object of the present invention to provide a low cost apparatus for determining the position of an object using a global positioning satellites.

It is an additional object of the present invention to provide a low cost method and apparatus for determining the position of an object using a global positioning satellites that does not perform correlation on a down-converted signal.

It is a further object of the present invention to provide a low cost method and apparatus for determining the position of an object using a global positioning satellites that has good signal-to-noise efficiency in order to accurately determine position and velocity of the object.

These and other objects can be achieved according to the principles of the present invention wherein a method for generating pseudo-range data and pseudo-range rates in a global positioning satellite receiver for transmission to a ground station sequentially generates pseudo-random noise codes corresponding to known satellite codes in response to address signals received from a microprocessor, generates a de-spread signal by de-spreading a radio frequency signal in response to the generated pseudo-random noise codes, detects when the de-spread signal is indicative of correlation between the radio frequency signal and the generated pseudo-random noise codes, and generates pseudo range data upon correlation.

Additionally, these and other objects can be achieved according to the principles of the present invention wherein a global positioning satellite receiver having an antenna for receiving a L1 signal from a satellite and a preamplifier for converting the L1 signal to a radio frequency signal wherein the global positioning satellite receiver generates pseudo-range data and pseudo-range rates for transmission to a ground station and incorporates a pseudo-random noise code generator for sequentially generating pseudo-random noise codes corresponding to known satellite codes in response to address signals received from a microprocessor, a correlation mixer for de-spreading the radio frequency signal in response to the generated pseudo-random noise codes, a detector for detecting when an output of the correlation mixer is indicative of correlation between the radio frequency signal and the generated pseudo-random noise codes, and the microprocessor which generates the pseudo-range data in response to an output of the detector.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

In the following detailed description, many specific details are set forth to provide a more thorough understanding of the present invention. It will be apparent, however, to those skilled in the art, that the present invention may be practiced without these specific details. In other instances, well known circuits have not been described so as not to obscure the present invention.

DETAILED DESCRIPTION OF THE PREFERRED EMBODIMENTS

Figure 1:
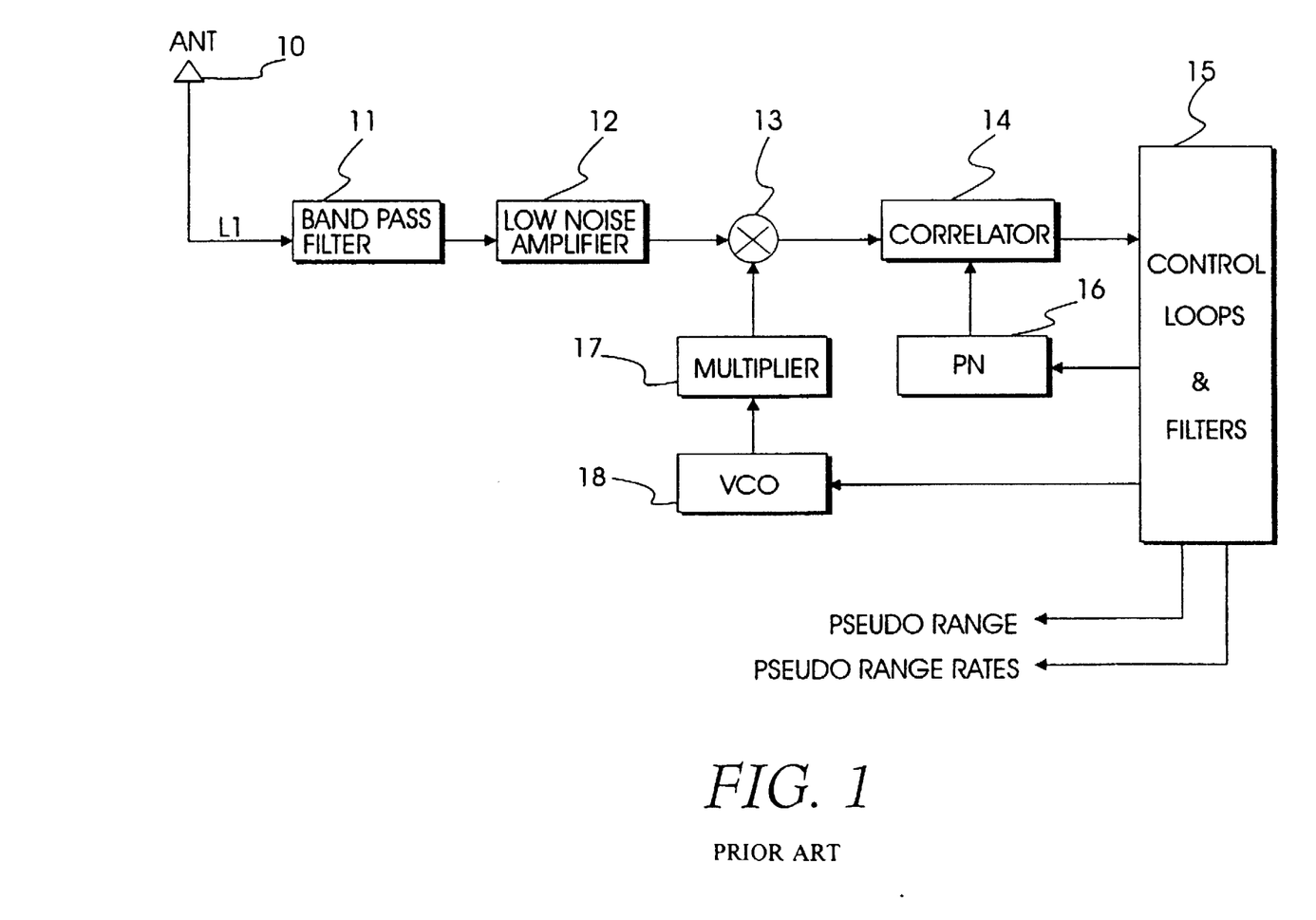
FIG. 1 illustrates a simplified block diagram typifying a conventional C/A code global positioning satellite receiver.

FIG. 1 is a generalized illustration simplifying a conventional GPS receiver, wherein a L1 signal received through an antenna 10 is band pass filtered by band pass filter 11 and amplified by a low noise amplifier 12 to output a radio frequency (RF) signal. The RF signal output from low noise amplifier 12 is down converted to an intermediate frequency (IF) by mixing the RF signal at mixer 13 with an output of a voltage controlled oscillator 18 via multiplier 17 which multiplies the output of the voltage controlled oscillator 18 by a predetermined value, e.g. 2. Since the L1 signal was spread in response to modulation by a pseudo-random noise (PRN) code, i.e. a C/A code or P code, the resulting IF signal is provided to a correlator 14 to be correlated, or "de-spread", with an internally generated pseudo-random noise code from pseudo-random noise code generator 16. Raw pseudo-ranges are determined in control loop and filter unit 15 by observing where in the C/A code sequence that correlation occurs. The control loop and filter unit 15 will typically employ a Costas Loop to decode a 50 bit per second navigation message and also use either a Costas Loop or a separate carrier tracking loop to phase lock the voltage controlled oscillator 18 to the satellite carrier to compensate for Doppler effects. Control loop and filter unit 15 will provide pseudo ranges and range rates to a microprocessor (not shown) for deriving position, velocity and time information. The raw pseudo-ranges are corrected by the microprocessor to compensate for clock errors, atmospheric effects, and other factors. The global positioning satellite receiver depicted by FIG. 1 illustrates a necessary down converting process before the correlation step.

Figure 2:
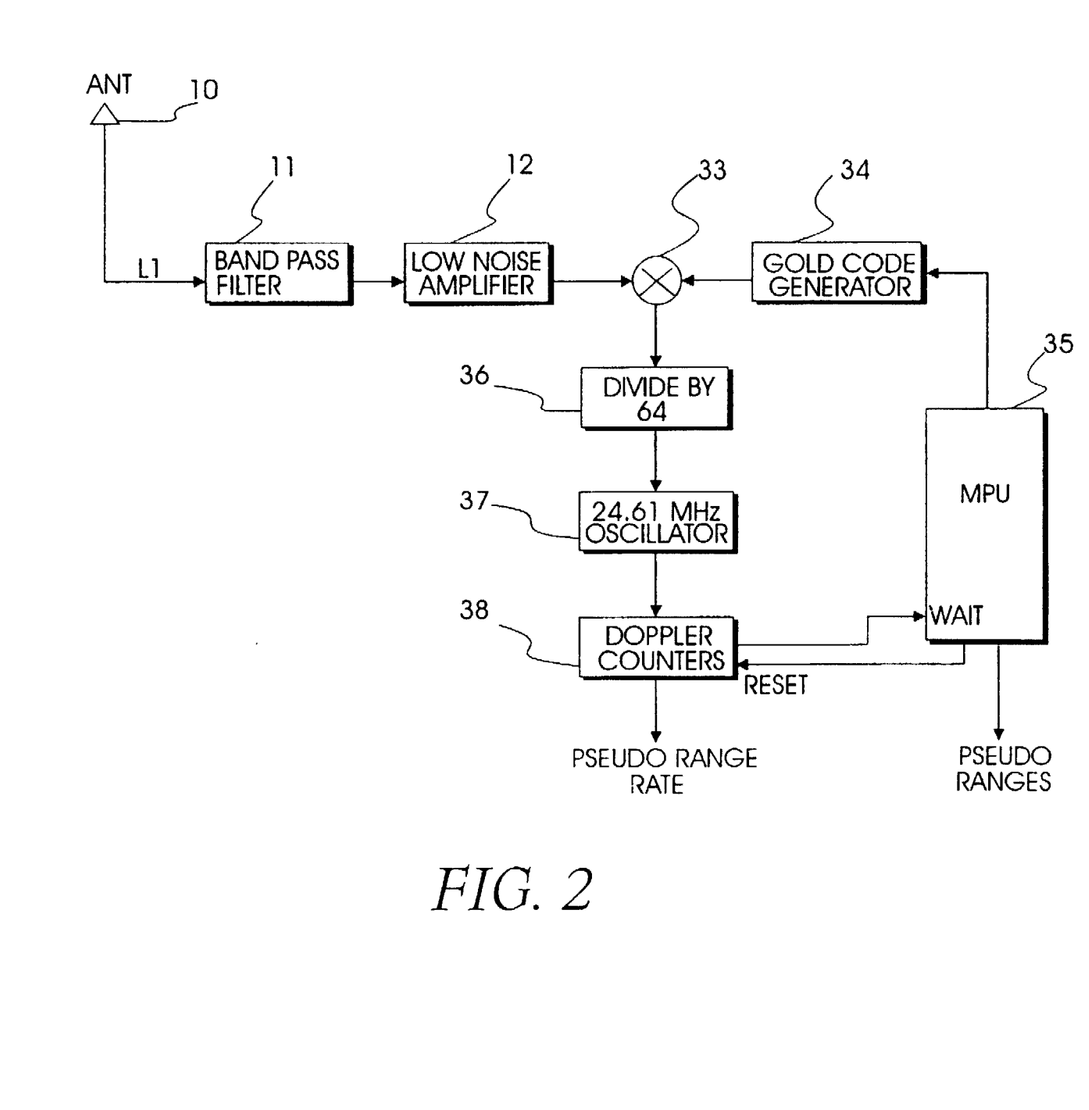
FIG. 2 is a preferred embodiment of a global positioning satellite receiver constructed according to the principles of the present invention.

A global positioning satellite receiver having an antenna for receiving a L1 signal from a satellite and a preamplifier for converting the L1 signal to a radio frequency signal for generating pseudo-range data and pseudo-range rates for transmission to a ground station and having a pseudo-random noise code generator for sequentially generating pseudo-random noise codes corresponding to known satellite codes in response to address signals received from a microprocessor, a correlation mixer for de-spreading the radio frequency signal in response to the generated pseudo-random noise codes, and a detector for detecting when an output of the correlation mixer is indicative of correlation between the radio frequency signal and the generated pseudo-random noise codes, wherein the microprocessor generates the pseudo-range data in response to an output of the detector is described in detail below in connection with FIG. 2.

A preferred embodiment of a global positioning satellite receiver of the present invention does not require the L1 signal be down converted before correlation is attempted. Referring now to FIG. 2, an L1 signal is received by an antenna 10 and input to a preamplifier stage comprising a band pass filter 11 and a low noise amplifier 12, and is output from low noise amplifier 12 as a radio frequency (RF) signal. A mixer 33, also known as a code correlator, receives the RF signal and a Gold code generated by an internal pseudo-random noise code generator, i.e., Gold code generator 34. Gold code generator 34 is a nonvolatile memory such as a ROM or an EPROM having codes corresponding to satellite codes in the Global Positioning Satellite System stored therein in a predetermined sequential order. Alternatively, Gold code generator 34 is implemented by a state machine consisting of a pair of 10-stage feedback shift registers. Before the RF signal enters mixer 33, the global positioning satellite signal of interest has a bandwidth of about 2 MHz with a relatively constant power spectral density about the L1 carrier. When correlation occurs between the internally generated Gold codes one of the satellite Gold codes, the power contribution of the satellite being tracked at precisely the L1 carrier will increase by about 30 dB.

Initially, microprocessor (MPU) 35 enters a code tracking loop and thus addresses Gold code generator 34 to cause Gold code generator 34 to sequentially output Gold codes corresponding to the satellite Gold codes until correlation occurs. Once correlation occurs, the microprocessor 35 enters an operational state which slows the receiver code sequence to stay locked with the satellite code sequence.

The output of mixer 33 is amplified and fed to a prescaler 36 to be divided by a predetermined ration N, where N is equal to 64 in the present example. Prescaler 36 provides a divided signal to a crystal oscillator 37 whose frequency is precisely L1/N. The prescaler and oscillator act as a narrow band filter At the instant correlation occurs, the crystal will oscillate, which can easily be detected in numerous ways. At the instant this oscillation begins, the raw pseudo-range is determined by knowing the offset into the Gold code sequence. The offset into the Gold code sequence is related to the pseudo-range.

The code tracking loop is implemented as follows. When attempting to correlate, microprocessor 35 enters a loop in which it begins to execute a series of NOP's (No Operations). An instruction pointer of microprocessor 35 increments after executing each NOP and address lines of microprocessor 35 act as the outputs of a synchronous counter. These incrementing microprocessor address lines drive the address lines of a ROM containing the Gold code sequence, i.e. Gold code generator 34. The clock of the microprocessor 35 is selected so that the Gold code is sequenced at 1.043 MHz, (1.023 MHz+20 KHz). This is slightly faster than the nominal 1.023 MHz chipping rate plus the largest expected Doppler shift. The largest Doppler shift of a GPS satellite signal at L1 is about 7.5 KHz. The internally generated Gold code sequence will eventually come into correlation with the satellite Gold code. At this point, microprocessor 35 enters into a loop which slows the receiver code sequence to stay locked with the satellite code sequence. This is done by occasionally asserting, or charging, the WAIT or READY line of microprocessor 35. Assertion of the WAIT line inserts wait states into the read cycle of microprocessor 35, thereby effectively slowing the chipping rate of Gold code generator 34.

Microprocessor 35 (by way of internal programmable counters or a real time clock common to many microprocessors) generates a regular pulse train which defines the receiver epoch. At the beginning of each epoch, while the receiver is in the tracking loop, an interrupt is generated. When microprocessor 35 enters the interrupt service routine, the address corresponding to the Gold code sequence offset output by microprocessor 35 is also pushed into the microprocessor's stack. The offset into the Gold code sequence is related to the pseudo-range. Therefore, when correlation occurs between the internally generated Gold code and the satellite Gold code, the interrupt service routine is able to simply pop the address of the Gold code right off the stack and, for example, send it to telemetry electronics of a balloon radiosonde. The address popped off the stack represents the raw pseudo-range (Doppler range) value used by a ground station to determine the position of the global positioning receiver. Doppler shifts (pseudo-range rates) can also be measured. The internal chipping rate is always faster than any satellite chipping rate. When the receiver begins to correlate, correlation detection oscillator 37 begins to oscillate. The oscillation output from oscillator 37 is input to a counter chain, i.e., Doppler counters 38. The time during which correlation occurs, as the receiver chipping clock causes the receiver to slew through correlation, is directly proportional to the Doppler shift. Therefore, a final reading, in response to the oscillation output, of Doppler counters 38 indicates how long it took the receiver to slew through correlation, this final reading is a measurement of the pseudo range rate (Doppler shift). Alternately, Doppler shift can be measured by knowing the rate at which the WAIT line must be asserted by the control loop in order to maintain code tracking. After microprocessor 35 outputs pseudo-range data the code tracking loop is restarted at the normal chipping rate and the microprocessor resets Doppler counters 38 to obtain a new count to determine how ling it takes the receiver to slew through correlation for a next satellite code.

Figure 3:
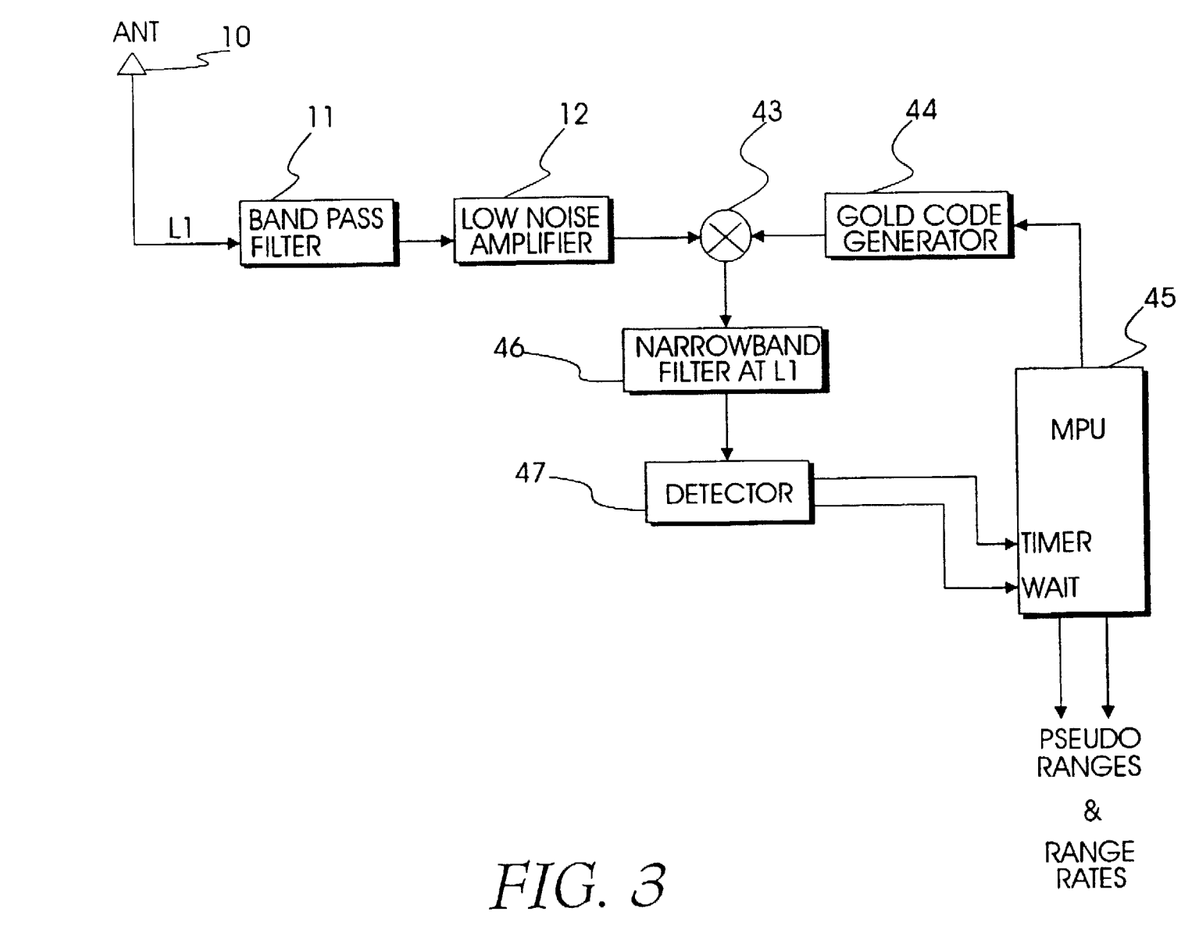
FIG. 3 is an alternate embodiment of a global positioning satellite receiver constructed according to the principles of the present invention.

An alternative embodiment of a global positioning satellite receiver of the present invention is illustrated in FIG. 3. The alternative embodiment, like the preferred embodiment, does not require the L1 signal to be down converted before correlation is attempted. The L1 signal is received by an antenna 10 and output as a radio frequency (RF) signal by a preamplifier stage comprising a band pass filter 11 and a low noise amplifier 12. A mixer 43, also known as a code correlator, receives the RF signal and a Gold code generated by an internal pseudo-random noise generator, i.e.,Gold code generator 44. Gold code generator 44 is a nonvolatile memory such as a ROM or an EPROM having codes corresponding to the satellite codes in the Global Positioning Satellite System stored therein in a predetermined sequential order. Alternatively, Gold code generator 44 is implemented by a state machine consisting of a pair of 10-stage feedback shift registers. Before the RF signal enters mixer 43, the global positioning satellite signal of interest has a bandwidth of about 2 MHz with a relatively constant power spectral density about the L1 carrier. When correlation occurs between the internally generated Gold codes one of the satellite Gold codes, the power contribution of the satellite being tracked at precisely the L1 carrier will increase by about 30 dB.

Microprocessor (MPU) 45 enters a code tracking loop in response to a timer control signal from detector 47 at start-up and thus starts sending addresses to Gold code generator 44 to cause Gold code generator 44 to sequentially output Gold codes corresponding to the satellite Gold codes until correlation occurs.

The output of mixer 43 is amplified and fed to a narrow band filter 46 having a narrow band centered at L1, e.g., a Surface Acoustic Wave (SAW) or a Surface Transverse Wave (STW) filter. The bandwidth of filter 46 must be much more narrow than 2 MHz at L1 for the system to work. When correlation occurs, the output of filter 46 will increase by approximately 30 dB, which can be easily detected in various ways by a detector 47. Once correlation occurs, microprocessor 45 enters an operational state which slows the receiver code sequence to stay locked with the satellite code sequence, as follows. The moment that this increase in power is detected, detector 47 provides a detection signal to a WAIT input of microprocessor 45 and a loop similar to the one described with regard to FIG. 2, is entered by microprocessor 45 to obtain the pseudo ranges. Additionally, Doppler shift, i.e., pseudo range rates, can be measured by timing how long it takes for the receiver to slew through correlation using an internal timer or counter of the microprocessor.

Figure 4:
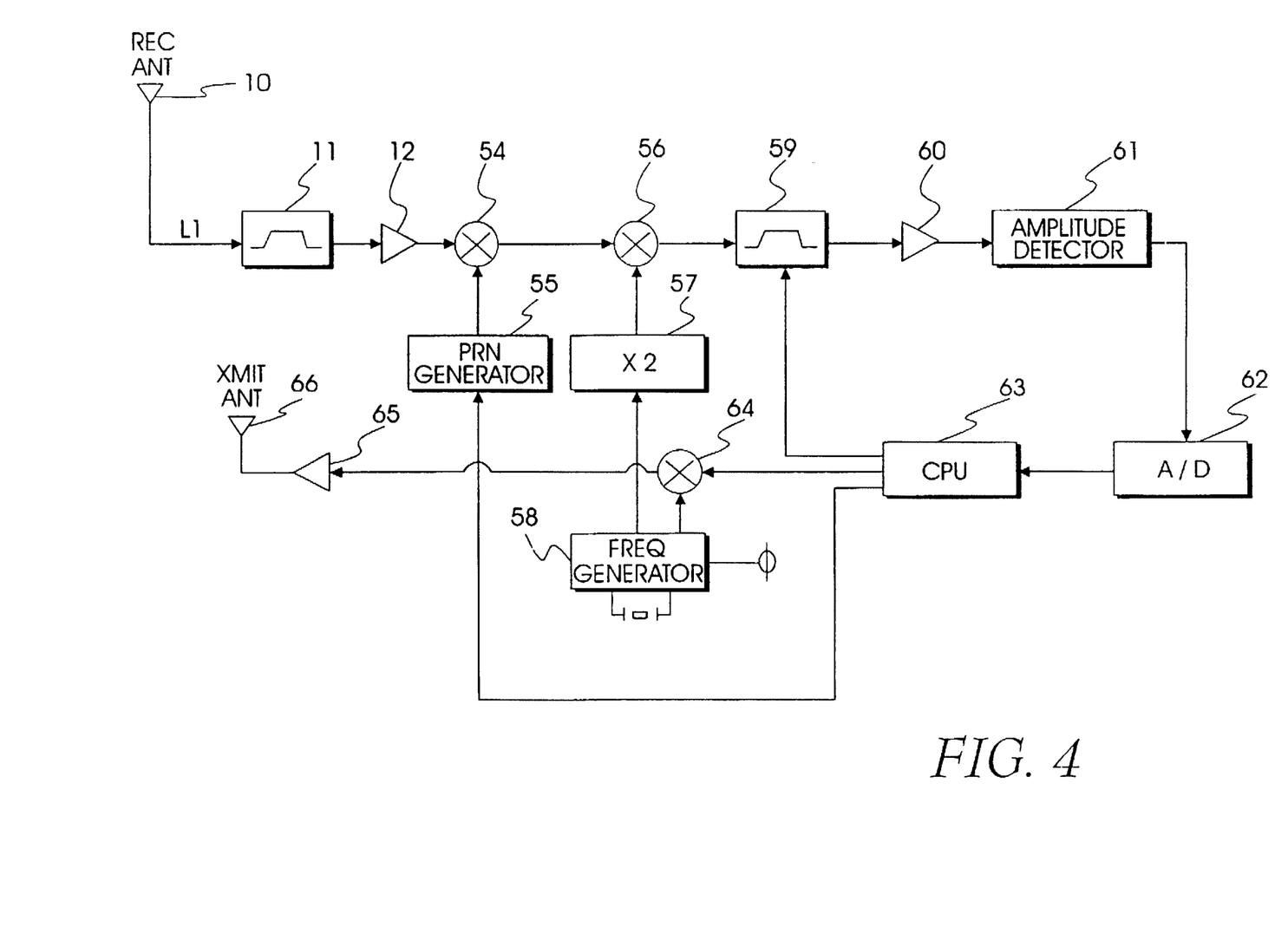
FIG. 4 is another alternate embodiment of a global positioning satellite receiver constructed according to the principles of the present invention.

In another alternative embodiment, FIG. 4, has a L1 (satellite) signal which received by an antenna 10 and output as a radio frequency (RF) signal by a preamplifier stage comprising a band pass filter 11 and a low noise amplifier 12. A first mixer 54, also known as a code correlator or a de-spreading mixer, receives the RF signal and a pseudo-random noise code generated by an internal pseudo-random noise code generator 55. Pseudo-random noise code generator 55 is a nonvolatile memory such as a ROM or an EPROM having codes corresponding to the satellite codes in the Global Positioning Satellite System stored therein in a predetermined sequential order. Alternatively, pseudo-random noise code generator 55 is implemented by a state machine consisting of a pair of 10-stage feedback shift registers. Before the RF signal enters the mixer, the global positioning satellite signal of interest has a bandwidth of about 2 MHz with a relatively constant power spectral density about the L1 carrier. When correlation occurs between the internally generated pseudo-random noise codes and one of the satellite codes, the power at precisely the L1 carrier will increase by about 30 dB above the power across the rest of the 2 MHz band. An output of the first mixer 54 is supplied to one input of a second mixer 56 for down conversion. Second mixer 56 down converts the output of first mixer 54, in response to a signal generated by a frequency generator 58 via a multiplier 57, to a frequency which is in the range of a microprocessor driven programmable bandpass filter 59. The output of second mixer 56 is filtered by programmable bandpass filter 59, amplified by amplifier 60 and then provided to an amplitude detector 61. The output of amplitude detector 61 is digitally converted by an analog-to-digital (A/D) converter 62. The digitally converted signal is then input to a central processing unit (CPU) 63 comprising a microprocessor (not shown). The microprocessor adjusts the chip phase of pseudo-random noise code generator 55 so that the output of amplitude detector 61 achieves a maximum level. The microprocessor also dynamically adjusts the bandpass and center frequency of programmable bandpass filter 59 to maximize signal-to-noise and to minimize satellite acquisition time. The chip phase of pseudo-random noise code generator 55 is adjusted by the address signals output by the microprocessor. These addresses are periodically recorded onto the microcomputer's stack as raw pseudo range data. Once correlation is detected in response to the data from analog-to-digital converter 62, the last address pushed onto the stack is popped off the stack and stored in an internal memory (not shown) of CPU 63. After the global positioning satellite receiver has established correlation with several satellites, the pseudo range data for these satellites are read from the internal memory of CPU 63 and grouped into a data block. The data block is output by CPU 63 to a third mixer 64 to modulate a frequency signal output by frequency generator 58. The output of third mixer 64 is then amplified by amplifier 65 and transmitted, i.e., telemetered, via antenna 66 to a ground station (not shown). The ground station, using known algorithms, processes the pseudo range data to determine the position, altitude and velocity of the global positioning satellite receiver. Additionally, Doppler shift, i.e., pseudo range rates, can be measured by using an internal timer or counter of the microprocessor to time how long it take for the receiver to slew through correlation.

Each code generator of the foregoing described embodiments is comprised of a nonvolatile memory such as a ROM or an EPROM having codes, i.e., Gold codes or pseudo-random noise codes corresponding to the satellite codes, i.e., C/A codes or P codes, in the Global Positioning Satellite System stored therein in a known predetermined sequential order. Alternatively, a code generator is implemented by a state machine consisting of a pair of 10-stage feedback shift registers. The predetermined sequential order in which the codes are stored in the code generators is known by the ground station (not shown), wherein each chip position in the sequential order identifies a corresponding satellite. The ground station, using known algorithms, processes the address data transmitted as pseudo-range data to determine which satellite the global positioning satellite receiver correlated with in order to calculate the position, altitude and velocity of the global positioning satellite receiver.

As described above, the present invention provides a method and apparatus having good signal-to-noise efficiency which mixes the received satellite signal with the pseudo random noise (C/A) code used to spread the satellite signal for determining position and velocity of an object using global positioning satellites thus eliminating the need to down-convert the satellite signal before establishing correlation.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A global positioning satellite receiver for generating pseudo-range data and pseudo-range rates for transmission to a ground station, said global positioning satellite receiver having an antenna and a preamplifier for receiving a L1 signal from a satellite and outputting the L1 signal as a radio frequency signal, said global positioning satellite receiver comprising:

a pseudo-random noise code generator for sequentially generating pseudo-random noise codes, corresponding to known satellite codes, in response to address signals received from microprocessor means;

a correlation mixer for de-spreading said radio frequency signal in response to said generated pseudo-random noise codes;

detecting means, for detecting when an output of said correlation mixer is indicative of correlation between said radio frequency signal and said generated pseudo-random noise codes, wherein said detecting means includes:

a prescaler for dividing said output of said correlation mixer by a value N, oscillating means, in response to an output of said prescaler, for outputting an oscillation signal when said output of said correlation mixer is indicative of correlation between said radio frequency signal and said generated pseudo-random noise codes, and Doppler counter means for determining how long said global positioning satellite receiver takes to slew through correlation to obtain a measurement of the pseudo-range rate, a final reading of said Doppler counters means being output as said pseudo-range rate in response to said oscillation signal, said Doppler counter means controlling said microprocessor means to output said pseudo range data in response to said oscillation signal.

2. The global positioning satellite receiver as set forth in claim 1, wherein said pseudo-random noise code generator includes a nonvolatile memory.

3. The global positioning satellite receiver as set forth in claim 2, wherein said nonvolatile memory includes an EPROM.

4. The global positioning satellite receiver as set forth in claim 1, wherein said pseudo-random noise codes includes Gold codes.

5. A global positioning satellite receiver for generating pseudo-range data and pseudo-range rates for transmission to a ground station, said global positioning satellite receiver having an antenna and a preamplifier for receiving a L1 signal from a satellite and outputting the L1 signal as a radio frequency signal, said global positioning satellite receiver comprising:

a pseudo-random noise code generator for sequentially generating pseudo-random noise codes, corresponding to known satellite codes, in response to address signals received from microprocessor means;

a correlation mixer for de-spreading said radio frequency signal in response to said generated pseudo-random noise codes;

detecting means, for detecting when an output of said correlation mixer is indicative of correlation between said radio frequency signal and said generated pseudo-random noise codes, wherein said detecting means includes:

means for down converting an output of said correlation mixer to an intermediate frequency signal, programmable bandpass filter means for filtering said intermediate frequency signal, detector means for detecting an amplitude of an output of said programmable filter means, and converting means for converting an output of said detector means to a digital signal, said digital signal controlling said microprocessor means to store said pseudo range data and a pseudo range rate.

6. The global positioning satellite receiver as set forth in claim 5, wherein said means for down converting includes:

a frequency generator for generating a predetermined frequency signal;

multiplier means for producing a down converting frequency signal by multiplying said predetermined frequency signal by a predetermined value; and mixer means for mixing said output of said correlation mixer and said down converting frequency signal.

7. The global positioning satellite receiver as set forth in claim 6; further including:

said microprocessor means grouping a plurality of stored pseudo-range data and a plurality of stored pseudo-range rates as transmission data; and means for mixing said transmission data and said predetermined frequency signal for transmission to store said pseudo range data and a pseudo range rate.

8. The global positioning satellite receiver as set forth in claim 5, wherein said pseudo-random noise code generator includes a nonvolatile memory.

9. The global positioning satellite receiver as set forth in claim 8, wherein said nonvolatile memory includes an EPROM.

10. The global positioning satellite receiver as set forth in claim 5, wherein said pseudo-random noise codes include Gold codes.

11. A method for generating pseudo-range data and pseudo-range rates in a global positioning satellite receiver for transmission to a ground station, said global positioning satellite receiver having an antenna and a preamplifier for receiving a L1 signal from a satellite and outputting the L1 signal as a radio frequency signal, said method comprising the steps of:

sequentially generating pseudo-random noise codes, corresponding to known satellite codes, in response to address signals received from a microprocessor;

cycling said microprocessor through a receiver code sequence to enable said microprocessor to generate said address signals;

storing address data corresponding to said address signals by pushing said address data onto a stack in said microprocessor;

generating a de-spread signal by de-spreading said radio frequency signal in response to the generated pseudo-random noise codes;

detecting when said de-spreading signal is indicative of correlation between said radio frequency signal and said generated pseudo-random noise codes;

generating, by said microprocessor, said pseudo range data when said detecting means detects correlations entering an interrupt routine when said detecting step detects correlation, wherein said interrupt routine reads a last stored address data by popping said last stored address data off said stack;

outputting said address data popped off said stack as said pseudo-range data;

dividing said de-spread signal by a value N;

generating an oscillation signal in response to an output of said dividing step which is indicative of said correlation;

starting a counting operation, by Doppler counters, to determine how long said global positioning satellite receiver takes to slew through correlation to obtain a measurement of the pseudo-range rate, a final reading of said Doppler counters being output as said pseudo-range rate in response to said oscillation signal;

providing a control signal from said Doppler counters to a wait input terminal of said microprocessor in response to said oscillation signal; and inserting a wait state into a read cycle of said microprocessor to effectively slow said step of sequentially generating pseudo-random noise codes, in response to said control signal, and then performing said step of entering an interrupt routine.

12. A method for generating pseudo-range data and pseudo-range rates in a global positioning satellite receiver for transmission to a ground station, said global positioning satellite receiver having an antenna and a preamplifier for receiving a L1 signal from a satellite and outputting the L1 signal as a radio frequency signal said method comprising the steps of:

sequentially generating pseudo-random noise codes, corresponding to known satellite codes, in response to address signals received from a microprocessor comprising the following substeps:

cycling said microprocessor through a receiver code sequence to enable said microprocessor to generate said address signals, and storing address data corresponding to said address signals by pushing said address data onto a stack in said microprocessor;

generating a de-spread signal by de-spreading said radio frequency signal in response to the generated pseudo-random noise codes;

detecting when said de-spreading signal is indicative of correlation between said radio frequency signal and said generated pseudo-random noise codes wherein said detecting step further includes the substeps of;

producing an intermediate frequency signal by down converting said de-spread signal, producing a filtered signal by bandpass filtering said intermediate frequency signal, detecting a maximum level of said filtered signal as an indication of correlation, said microprocessor generating said pseudo-range data in response to the maximum level of said filtered signal, and programmably controlling, by said microprocessor, a bandpass filter for performing said step of producing a filtered signal to maximize a signal-to-noise ratio and to minimize satellite acquisition time;

generating, by said microprocessor, said pseudo range data when said detecting means detects correlation comprising the following substeps:

entering an interrupt routine when said detecting step detects correlation, wherein said interrupt routine reads a last stored address data by popping said last stored address data off said stack, and outputting said address data popped off said stack as said pseudo-range data.

13. A method for generating pseudo-range data and pseudo-range rates in a global positioning satellite receiver for transmission to a ground station, said global positioning satellite receiver having an antenna and a preamplifier for receiving a L1 signal from a satellite and outputting the L1 signal as a radio frequency signal, said method comprising the steps of:

sequentially generating pseudo-random noise codes, corresponding to known satellite codes, in response to address signals received from a microprocessor;

generating a de-spread signal by de-spreading said radio frequency signal in response to the generated pseudo-random noise codes;

detecting when said de-spreading signal is indicative of correlation between said radio frequency signal and said generated pseudo-random noise codes; and generating, by said microprocessor, said pseudo range data when said detecting means detects correlation;

dividing said de-spread signal by a value N;

generating an oscillation signal in response to an output of said dividing step is indicative of said correlation;

starting a counting operation, by Doppler counters, to determine how long said global positioning satellite receiver takes to slew through correlation to obtain a measurement of the pseudo-range rate, a final reading of said Doppler counters being output as said pseudo-range rate in response to said oscillation signal;

controlling said microprocessor by said Doppler counters to output said pseudo range data in response to said oscillation signal.

14. A method for generating pseudo-range data and pseudo-range rates in a global positioning satellite receiver for transmission to a ground station, said global positioning satellite receiver having an antenna and a preamplifier for receiving a L1 signal from a satellite and outputting the L1 signal as a radio frequency signal, said method comprising the steps of:

sequentially generating pseudo-random noise codes, corresponding to known satellite codes, in response to address signals received from a microprocessor;

generating a de-spread signal by de-spreading said radio frequency signal in response to the generated pseudo-random noise codes;

detecting when said de-spreading signal is indicative of correlation between said radio frequency signal and said generated pseudo-random noise codes wherein said detecting step further includes the substeps of:

producing an intermediate frequency signal by down converting said de-spread signal producing a filtered signal by bandpass filtering said intermediate frequency signal, detecting a maximum level of said filtered signal as an indication of correlation, said microprocessor generating said pseudo-range data in response to the maximum level of said filtered signal, and programmably controlling, by said microprocessor, a bandpass filter for performing said step of producing a filtered signal to maximize a signal-to-noise ratio and to minimize satellite acquisition time;

generating, by said microprocessor, said pseudo range data when said detecting means detects correlation.

* * * * *